United States Patent
Kartashov et al.

(10) Patent No.: US 10,606,493 B1
(45) Date of Patent: Mar. 31, 2020

(54) SYSTEM AND METHOD FOR ADJUSTING MEMORY ALLOCATION FOR VIRTUAL MACHINES

(71) Applicant: Parallels International GmbH, Schaffhausen (CH)

(72) Inventors: Aleksandr Kartashov, Moscow (RU); Iurii Ovchinnikov, Moscow (RU); Nikolay Dobrovolskiy, Moscow (RU); Serguei M. Beloussov, Costa Del Sol (SG)

(73) Assignee: Parallels International GmbH, Schaffhausen (CH)

( * ) Notice: Subject to any disclaimer, the term of this patent is extended or adjusted under 35 U.S.C. 154(b) by 71 days.

(21) Appl. No.: 15/487,643

(22) Filed: Apr. 14, 2017

(51) Int. Cl.
*G06F 3/06* (2006.01)
*G06F 12/02* (2006.01)

(52) U.S. Cl.
CPC .......... *G06F 3/0631* (2013.01); *G06F 3/0604* (2013.01); *G06F 3/0653* (2013.01); *G06F 3/0665* (2013.01); *G06F 3/0673* (2013.01); *G06F 12/023* (2013.01)

(58) Field of Classification Search
CPC .... G06F 3/0604; G06F 3/0631; G06F 3/0653; G06F 3/0665; G06F 12/023
See application file for complete search history.

(56) References Cited

U.S. PATENT DOCUMENTS

| | | | | |
|---|---|---|---|---|
| 9,602,344 B1* | 3/2017 | Iyengar | ..................... | G06F 8/76 |
| 2006/0136761 A1* | 6/2006 | Frasier | .................... | G06F 9/505 |
| | | | | 713/320 |
| 2010/0235831 A1* | 9/2010 | Dittmer | ............... | G06F 9/45558 |
| | | | | 718/1 |
| 2012/0210042 A1* | 8/2012 | Lim | ..................... | G06F 12/0223 |
| | | | | 711/6 |
| 2013/0117522 A1* | 5/2013 | Schreter | ................ | G06F 12/084 |
| | | | | 711/170 |
| 2014/0059228 A1* | 2/2014 | Parikh | .................... | G06F 9/5005 |
| | | | | 709/226 |
| 2014/0372723 A1* | 12/2014 | Bobroff | ............... | G06F 11/3034 |
| | | | | 711/170 |
| 2014/0373010 A1* | 12/2014 | Folco | .................. | G06F 9/45533 |
| | | | | 718/1 |
| 2015/0039838 A1* | 2/2015 | Tarasuk-Levin | .... | G06F 12/0862 |
| | | | | 711/137 |
| 2015/0268874 A1* | 9/2015 | Bollandoor | ........... | G06F 3/0619 |
| | | | | 711/103 |

(Continued)

*Primary Examiner* — Hal Schnee
(74) *Attorney, Agent, or Firm* — Lowenstein Sandler LLP (57) ABSTRACT

A system and method is provided for managing memory allocated to a virtual machine running on a host platform. An exemplary method includes continuously calculating the amount of free physical memory of the host platform by subtracting the amount of physical memory currently used consumed by the host operating system from the total size of the physical memory on the host platform. Moreover, using the calculated amount of free physical memory, the method includes dynamically adjusting an overall limit of the physical memory that can be allocated to the virtual machine running on the host platform, and then allocating to the virtual machine an amount this allocated physical memory so that active pages can be stored in the allocated memory and directly accessed during operation by the virtual machine.

20 Claims, 5 Drawing Sheets

(56) References Cited

U.S. PATENT DOCUMENTS

| | | | |
|---|---|---|---|
| 2017/0046255 A1* | 2/2017 | Tsirkin | G06F 12/023 |
| 2017/0344298 A1* | 11/2017 | Shih | G06F 3/0631 |
| 2018/0024856 A1* | 1/2018 | Sumida | G06F 9/45558 718/1 |

* cited by examiner

SYSTEM AND METHOD FOR ADJUSTING MEMORY ALLOCATION FOR VIRTUAL MACHINES

TECHNICAL FIELD

The present disclosure generally relates to managing computing system resources, and, more particularly, to a system and method for optimizing memory management and allocation for virtual machines.

BACKGROUND

In virtual machine ("VM") technology, a user can create and run multiple operating environments on a computing device at the same time. Each operating environment, or virtual machine, requires its own operating system (OS) and can run software applications independently from the other virtual machines. Virtual machine technology provides many benefits as it can lower information technology (IT) costs through increased efficiency, flexibility and responsiveness. Each virtual machine acts as a separate environment that reduces risks and allows developers to quickly recreate different OS configurations or compare versions of applications designed for different OSs.

At the same time, when one or multiple virtual machines are running on a single computing device or server, each virtual machine will use a portion of the physical memory of the host. In this configuration, a type 2 hypervisor (i.e., a so called "hosted hypervisor") is a computer software that is installed in the existing operating system (i.e., the "host OS") and shares the available host physical memory with the host OS and other applications. Each virtual machine is typically configured to utilize a certain amount of the host physical memory that is available to the guest OS as the virtual RAM Under conventional designs, once the guest OS is started, the amount of physical memory assigned to each guest OS is allocated from a host OS memory pool and locked from the host OS memory management system. Thus, the locked memory cannot be used by the host OS while the guest OS is running. However, for current systems, a misconfiguration of the amount of the physical memory assigned to one or more of the virtual machines may result in either host OS or guest OS memory starvation and inefficient utilization of hardware resources.

Accordingly, a system and method is needed for efficiently allocating physical memory to each virtual machine launched and running on a host machine.

SUMMARY

Accordingly, a system and method is provided for optimizing memory management for virtual machines. In one aspect, a method is provided for managing memory allocation for a virtual machine running on a host platform. In this aspect, the method includes continuously calculating an amount of free physical memory of the host platform by subtracting an amount of physical memory currently used by a host operating system of the host platform from a total size of the physical memory for the host platform; dynamically adjusting an overall limit of the physical memory to be allocated to at least one virtual machine running on the host platform; and allocating, to the at least one virtual machine, an amount of the physical memory, such that the physical memory allocated to all virtual machines running on the host platform does not exceed the overall limit of the physical memory.

In another aspect, the method further includes storing a set of active pages in the allocated physical memory to be accessed by an application running on the at least one virtual machine.

In another aspect, the amount of physical memory currently used by the host operating system includes $M_{wired}$ and $M_{overhead}$, wherein $M_{wired}$ is an amount of the physical memory allocated for exclusive usage by an operating system kernel of the host operating system, and wherein $M_{overhead}$ is an amount of the physical memory used by the operation system kernel for memory management of the host operating system.

In another aspect, the method further includes calculating the amount of free physical memory of the host platform according to the formula $M_{host\_free}=M_{host}-M_{wired}-K_1-K_2 \times M_{overhead}$, wherein $K_1$ and $K_2$ are static configuration parameters.

In another aspect, the step of dynamically adjusting the overall limit of the physical memory allocated to the at least one virtual machine comprises decreasing the overall limit by a value of $M_{host\_free}$ if $M_{host\_free}$ is a negative value and greater than a first threshold; and increasing the overall limit by a value of $M_{host\_free}$ minus $M_{hyp\_free}$ if $M_{host\_free}$ is a positive value and greater than a second threshold, wherein $$M_{hyp\_free} = L - \sum_{i=1}^{n} W_i,$$

wherein L is the overall limit and $W_i$ is a size of an active working set of guest pages currently stored in the physical memory for the i-th virtual machine of the at least one virtual machine.

In another aspect, the method further includes adjusting the allocated amount of the physical memory to the at least one virtual machine based on patterns of user activity of the host operating system.

In another aspect, the adjusting of the allocated amount of the physical memory comprises: calculating a guest memory adjustment A; increasing the allocated amount of the physical memory if the guest memory adjustment A is above a first threshold; and decreasing the allocated amount of the physical memory if the guest memory adjustment A is below a second threshold.

In another aspect, the method further includes the calculating of the guest memory adjustment A comprises performing a plurality of m of memory measures of a time period and applying the memory measurements to a formula:

$$A = \frac{K_h \cdot \sum_{i=1}^{m}(h_i - 0.1 M_{host}) - K_g \cdot \sum_{i=1}^{m}(g_i - 0.1 M_{guest})}{m},$$

wherein m is the number of memory measurements, $K_h$, $K_g$ are predetermined weight coefficients, $M_{host}$ is a size of the physical memory of the host platform, $M_{guest}$ is a size of the allocated amount of the physical memory to the at least one virtual machine, $h_i$ is an amount of the free physical memory of the host platform in the i-th measurement, and $g_i$ is an amount of free guest memory of the allocated amount of the physical memory to the at least one virtual machine in the i-th measurement.

In another aspect, the method further includes increasing the allocated amount of the physical memory by a first predetermined amount of memory if the guest memory adjustment A is above a first threshold and decreasing the allocated amount of the physical memory by a second predetermined amount of memory if the guest memory adjustment A is below a second threshold.

In another aspect, wherein, upon initially launching a first virtual machine of the at least one virtual machine on the host platform, the method further includes calculating an initial amount of the free physical memory of the host platform by subtracting the amount of physical memory currently used by a host operating system of the host platform from the total size of the physical memory for the host platform; and setting the initial amount of the free physical memory of the host platform as the overall limit of the physical memory to be allocated to the at least one virtual machine.

In another aspect, a system is provided for managing memory allocation for a virtual machine running on a host platform. In this aspect, the system includes physical memory of the host platform; and a hypervisor running on a host operating system of the host platform, the hypervisor being designed to continuously calculate an amount of free physical memory of the host platform by subtracting an amount of physical memory currently used by the host operating system from a total size of the physical memory for the host platform, dynamically adjust an overall limit of the physical memory to be allocated to at least one virtual machine running on the host platform; and allocate, to the at least one virtual machine, an amount of the physical memory, such that the physical memory allocated to all virtual machines running on the host platform does not exceed the overall limit of the physical memory.

In another aspect of the system, the hypervisor is further designed to store a set of active pages in the allocated physical memory to be executed by an application running on the at least one virtual machine.

In another aspect of the system, the amount of physical memory currently used by the host operating system includes $M_{wired}$ and $M_{overhead}$, wherein $M_{wired}$ is an amount of the physical memory allocated for exclusive usage by an operating system kernel of the host operating system, and wherein $M_{overhead}$ is an amount of the physical memory used by the operation system kernel for memory management of the host operating system.

In another aspect of the system, the hypervisor further calculates the amount of free physical memory of the host platform according to the formula $M_{host\_free} = M_{host} - M_{wired} - K_1 - K_2 \times M_{overhead}$, wherein $K_1$ and $K_2$ are static configuration parameters.

In another aspect of the system, the hypervisor further dynamically adjusts the overall limit of the physical memory allocated to the at least one virtual machine by decreasing the overall limit by a value of $M_{host\_free}$ if $M_{host\_free}$ is a negative value and greater than a first threshold; and increasing the overall limit by a value of $M_{host\_free}$ minus $M_{hyp\_free}$ if $M_{host\_free}$ is a positive value and greater than a second threshold, wherein $$M_{hyp\_free} = L - \sum_{i=1}^{n} W_i,$$

wherein L is the overall limit and $W_i$ is a size of an active working set of guest pages currently stored in the physical memory for the i-th virtual machine of the at least one virtual machine.

In another aspect of the system, the hypervisor further adjusts the allocated amount of the physical memory to the at least one virtual machine based on patterns of user activity of the host operating system.

In another aspect of the system, the hypervisor further adjusts the allocated amount of the physical memory by calculating a guest memory adjustment A; increasing the allocated amount of the physical memory if the guest memory adjustment A is above a first threshold; and decreasing the allocated amount of the physical memory if the guest memory adjustment A is below a second threshold.

In another aspect of the system, the hypervisor further calculates the guest memory adjustment A by performing a plurality of m of memory measures of a time period and applying the memory measurements to a formula:

$$A = \frac{K_h \cdot \sum_{i=1}^{m}(h_i - 0.1 M_{host}) - K_g \cdot \sum_{i=1}^{m}(g_i - 0.1 M_{guest})}{m},$$

wherein m is the number of memory measurements, $K_h$, $K_g$ are predetermined weight coefficients, $M_{host}$ is a size of the physical memory of the host platform, $M_{guest}$ is a size of the allocated amount of the physical memory to the at least one virtual machine, $h_i$ is an amount of the free physical memory of the host platform in the i-th measurement, and $g_i$ is an amount of free guest memory of the allocated amount of the physical memory to the at least one virtual machine in the i-th measurement.

In another aspect of the system, the hypervisor further increases the allocated amount of the physical memory by a first predetermined amount of memory if the guest memory adjustment A is above a first threshold, and decreases the allocated amount of the physical memory by a second predetermined amount of memory if the guest memory adjustment A is below a second threshold.

In another aspect of the system, upon initially launching a first virtual machine of the at least one virtual machine on the host platform, the hypervisor further calculates an initial amount of the free physical memory of the host platform by subtracting the amount of physical memory currently used by a host operating system of the host platform from the total size of the physical memory for the host platform; and sets the initial amount of the free physical memory of the host platform as the overall limit of the physical memory to be allocated to the at least one virtual machine.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

Figure 1:
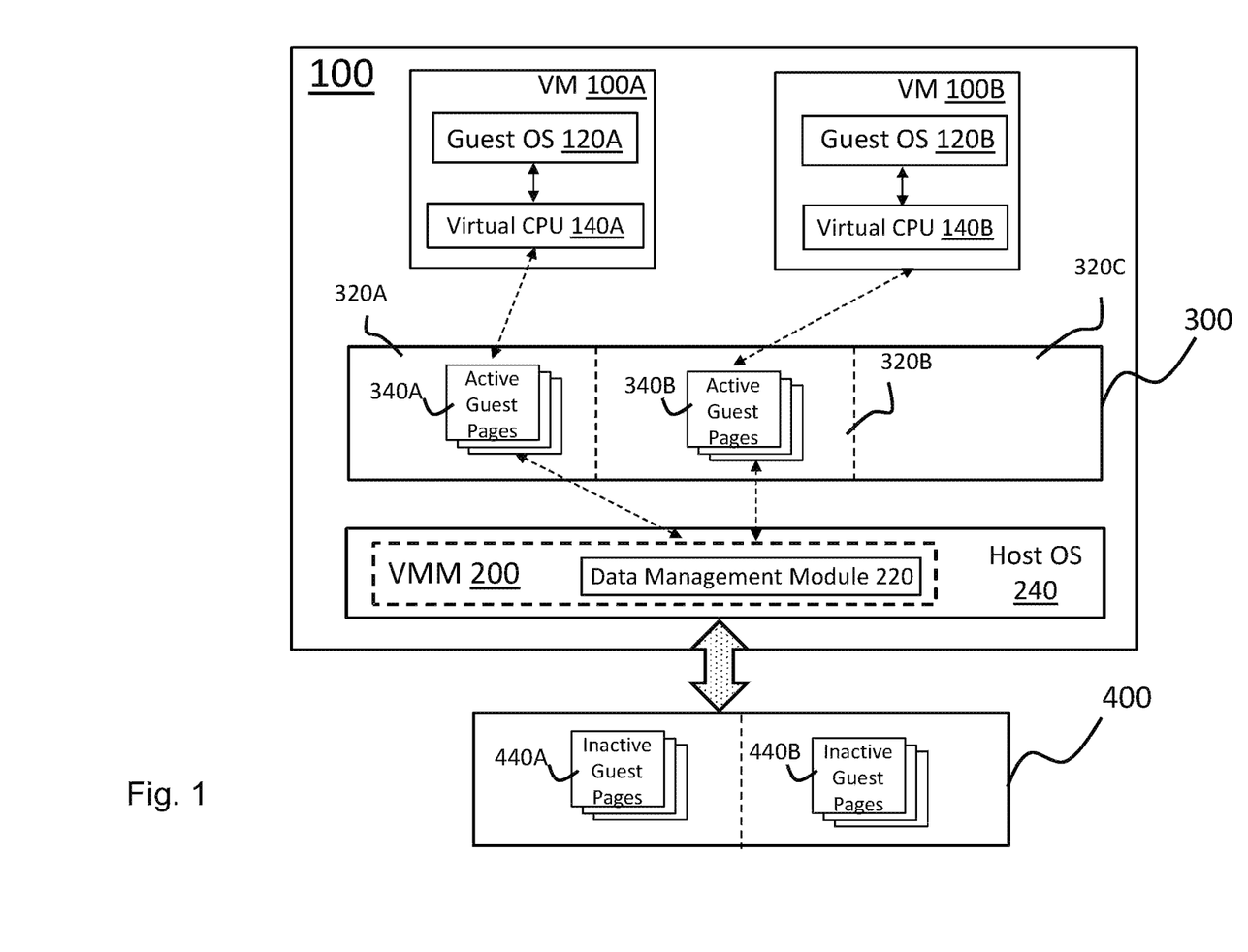
FIG. 1 illustrates a block diagram of a system for optimizing memory management for virtual machines according to an exemplary aspect.
Figure 5:
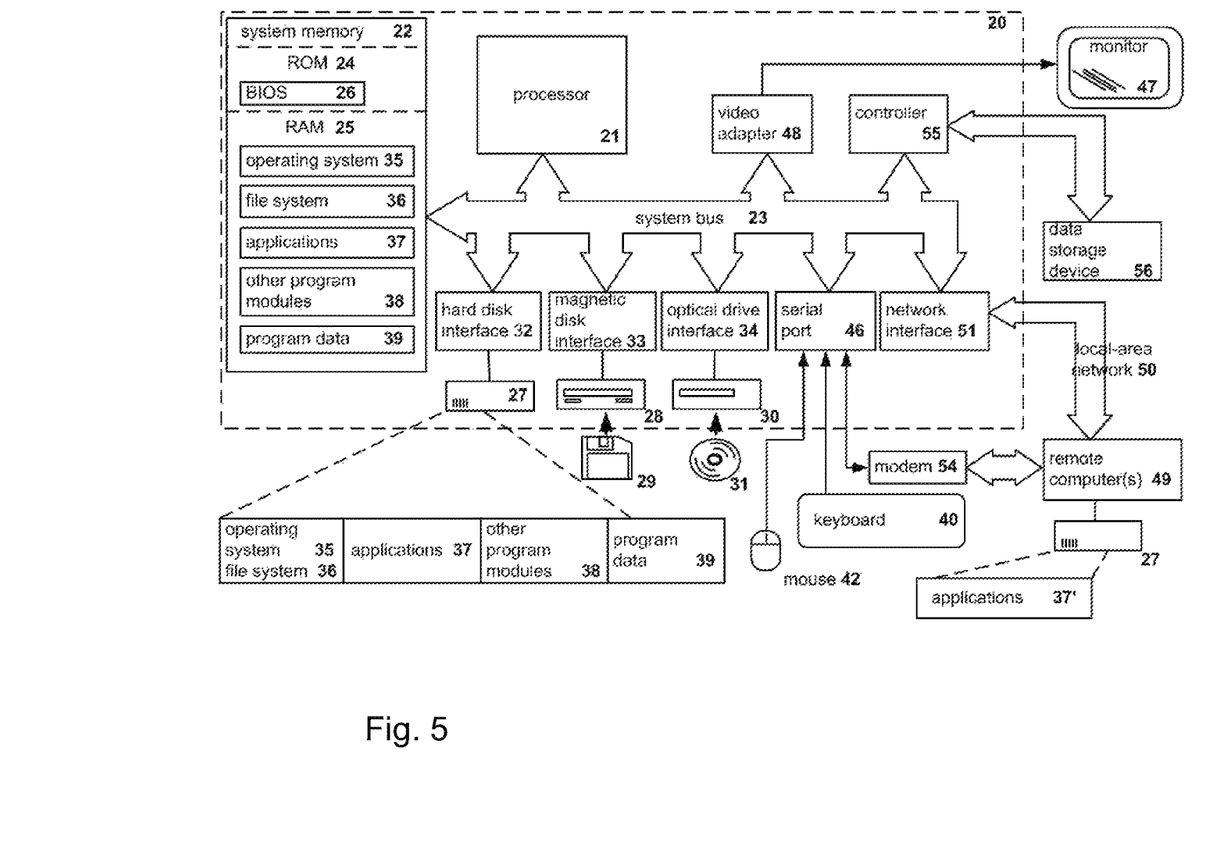
FIG. 5 illustrates a block diagram of an example of a general-purpose computer system (which can be a personal computer or server) on which the disclosed system and method can be implemented according to an exemplary aspect.

FIG. 1 illustrates a block diagram of a system for optimizing memory management for virtual machines according to an exemplary aspect. In general, the exemplary system includes a host computing system 100 (e.g., a host platform or computing device) that includes a host operating system 240 and physical electronic memory 300. The host computing system 100 be any type of computing device (e.g., personal computer, laptop, server, and the like) can include conventional hardware and/or software components that are well known to those in the art and are not illustrated in FIG. 1. For example, the host computing system will include one or more processors, a kernel, I/O interfaces, and the like. An exemplary block diagram of a computing device capable of serving as the host platform is illustrated in FIG. 5 and described below.

Moreover, one or a plurality of virtual machines can be installed on the host platform. It is shown that two virtual machines 100A and 100B are installed on the host platform 10, but it should be appreciated that any number of virtual machines can be launched and running on the host platform at a given time. In general, for purposes of this disclosure, most exemplary aspects contemplate that only a single virtual machine (e.g., virtual machine 100A) is utilized on the host platform 100 extensively, which is typically the case for a desktop environment. However, the disclosed method and system is not so limited to a single virtual machine.

As further shown, a hypervisor 200 can be installed on the host operating system 240 and can be computer software, firmware, and/or hardware, that creates and runs each of the virtual machines 100A and 100B. Although not shown, virtual machine monitors can be provided to manage each single virtual machine providing it with the virtual hardware. Moreover, according to the exemplary aspect, the hypervisor 200 provides the guest operating systems (i.e. "guest OSs") 120A and 120B of the respective virtual machines 100A and 100B with virtual operating platforms and manages the execution of the guest OSs 120A and 120B. Moreover, each virtual machine 100A and 100B will have a virtual CPU 140A and 140B (and/or process schedulers) that will access pages during execution of applications running on each virtual machine 100A and 100B. It is noted that all of the virtual hardware components of the virtual machine 100A and 100B can be implemented in software to emulate corresponding physical components, as would be appreciated to on skilled in the art.

As further shown, the system includes a host physical memory 300, which can be considered the "primary storage" (e.g., random-access memory or RAM) and is directly accessible by the virtual CPUs 140A and 140B, as well as the secondary storage 400 (e.g., hard disk drives), which is not directly accessible by the virtual CPUs 140A and 140B. According to the exemplary aspect, the hypervisor 200 includes a physical memory management module 220 that manages the allocation of physical memory 300 for the virtual machines running on the host platform 100 and an overall limit of the amount of physical memory that can be allocated to all virtual machines running on the host platform 100. In accordance with this allocation and the overall limit, the host operating system 240 can determine which guest pages are currently stored in the host physical memory 300 (i.e., the set of active pages) and which guest pages are only stored in the secondary storage 400 (i.e., the set of inactive pages). As will become readily apparent from the disclosure herein, the physical memory management module 220 can effectively, reduce the impact of misconfiguration and make the guest OS memory assignment less sensitive to the variability of the amounts of memory required by the host OS 240 and guest OSs 120A and/or 120B at a particular moment during operation.

In general, the term "module" as used herein can refer to a software service or application executed as part of the physical memory management module 220. In certain implementations, at least a portion, and in some cases, all, of a module can be executed on the processor of a general purpose computer. Accordingly, each module can be realized in a variety of suitable configurations, and should not be limited to any example implementation described herein.

According to the exemplary aspect, hypervisor 200 can assign portions or specified amounts of the host physical memory 300 to each virtual machine 100A and/or 100B running on the host platform 100. For example, as shown, a first region 320A can be an specified amount of the host physical memory 300 is assigned as guest virtual memory to virtual machine 100A and a second region 320B can be an specified amount of the host physical memory 300 is assigned as guest virtual memory to virtual machine 100B. Memory region 320C illustrates an example of another region of the host physical memory 300 that is not currently assigned to a virtual machine and may be reserved for host operating system 240, for example. In operation, hypervisor 200 assigns less host physical memory to each guest OS 120A and 120B than it is reported via the virtual ACPI. Thus, for example, the guest physical memory space (e.g., 320A and 320B) can be divided into 2 MB data blocks (i.e., guest physical pages) that may be split further into 4 KB blocks.

As further shown, there are two types of guest physical pages. The first type of guest physical pages can be considered "active" pages that are directly accessible by the associated guest OS (e.g., active guest pages 340A are provided in memory region 320A and accessible by guest OS 120A). Thus, there is a portion of the host physical memory 300 that stores the content of the active page so that the guest OS 120A is free to read and modify the page. Moreover, there are also "inactive" pages that can be stored in the host physical memory 300 or stored on secondary storage 400 (e.g., a hard disk drive), for example, but are considered inactive and that they cannot be directly accessed by the guest OS of the virtual machine. Thus, inactive guest pages 440A are for guest OS 120A (and possible other guest OSs), but cannot be directly accessed during operation of an application by virtual machine 100A. Thus, it should be appreciated that "inactive" pages do not require a dedicated portion of the host physical memory 300 and the memory 400 that stores the content of these pages (e.g., 440A and 440B) may be managed by the host OS 240.

According to the exemplary aspect, each set of active physical pages is considered an active working set. For example, the active guest pages 340A are considered the active working set for virtual machine 100A. According to the exemplary aspect, the physical memory management module 220 of the hypervisor 200 selects and dynamically adjust the maximum size (i.e., the overall limit) for all working sets of guest pages for each virtual machine. In general, there are two methods of maintaining the active working sets. For example, the hypervisor 200 can maintain the active working sets through the hardware-assisted mechanism, in which one or more a nested page tables ("NPTs") are employed to manage the guest physical memory (e.g., memory 320A). In general, an NPT is a hardware virtualization feature that maps guest physical pages to host physical pages. Valid NPT entries correspond to active guest physical pages (e.g., active guest pages 340A) while invalid entries correspond to inactive pages (e.g., inactive guest pages 440A). Thus, each virtual machine can maintain an NPT that includes page table entries that map the virtual memory address spaces to the address spaces in the guest physical memory (e.g., guest memory 320A). Alternatively, the physical memory management module 220 of the hypervisor 200 can implement the shadow paging mechanism in which the hypervisor 200 interprets a guest paging tree, builds a parallel paging structure that consist of entries that refer to the host physical memory (e.g., guest memory 320A) that corresponds to the active working set (e.g., active guest pages 340A) and controls the guest OS (e.g., guest OS 120A) of the corresponding virtual machine 100A to use the parallel paging structure to access the guest pages during execution. It should be appreciated that the method/algorithm used by the hypervisor 200 is not limited and be implemented according to either method (or alternative methods) according to the exemplary aspects.

Figure 2:
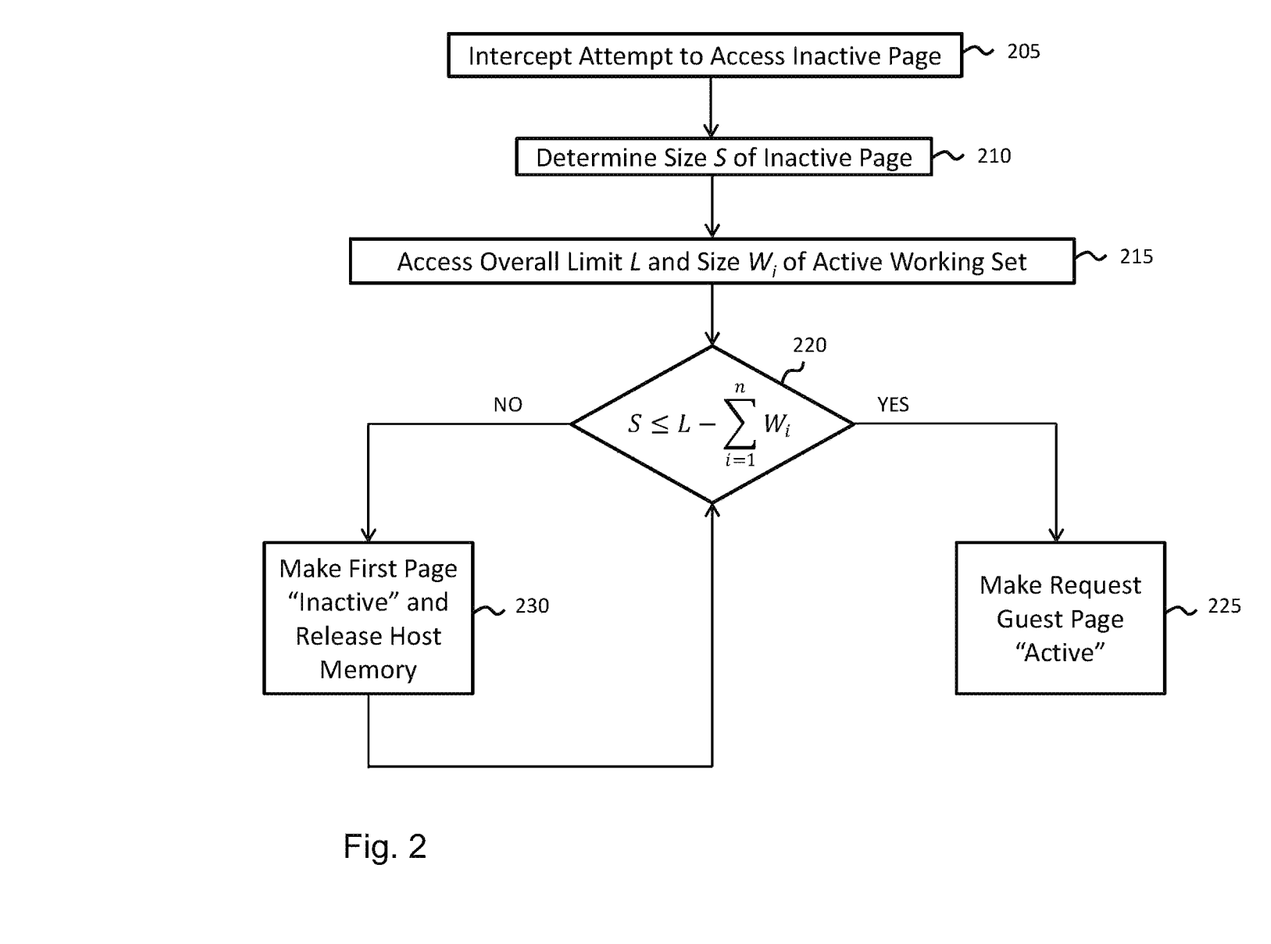
FIG. 2 illustrates a flowchart for a method of hypervisor managing active pages according to an exemplary aspect.

The hypervisor 200 further can monitor page access attempts by each guest OS to manage which active pages are stored in the associated guest physical memory. FIG. 2 illustrates a flowchart for a method of hypervisor managing active pages according to an exemplary aspect. In general, it should be appreciated that each of the flowcharts described herein may reference to the components shown in FIG. 1 and described above.

As shown, initially at step 205, the hypervisor 200 intercepts a request by a guest OS (e.g., guest OS 120A) to access an inactive guest physical page (e.g., one of inactive guest pages 440A). Next, at step 210, the hypervisor 200 obtains/determines the size S of the requested inactive pages on secondary storage 400 and also, at step 215, determines the overall limit L of all active working sets in host physical memory 300 as well as the size $W_i$ of the actual active working set. At step 220, the hypervisor 200 then can check the following condition:

$$S \leq L - \sum_{i=1}^{n} W_i,$$

wherein:
n=the number of running VMs,
S=size of the guest physical page,
L=the overall limit, and
$W_i$=the size of the active working set of the i-th VM.

In other words, at step 220, the hypervisor 200 accesses the overall limit (which is determined independently as will be discussed below) and subtracts the active working sets to determine available space in the overall limit. If the hypervisor 200 determines that the above-noted condition at step 220 is not valid, the method proceeds to step 230, where the hypervisor 200 forcibly makes $R_i$ pages (preferably only $R_i$ pages) reclaimed from the i-th VM:

$$R_i = \left(S - L + \sum_{i=1}^{n} W_i\right) \cdot \frac{\max(W_i - L_i, 0)}{\sum_{j=1}^{n} \max(W_j - L_j, 0)},$$

where $$L_i = L \cdot \frac{G_i}{\sum_{j=1}^{n} G_j} - \text{the limit of the active working set of the } i\text{-th VM},$$

$G_i$ – the size of the i-th VM RAM,

In other words, at most $R_i$ pages that were first added to the active working set for that virtual machine are forcibly made inactive (i.e., moved to secondary storage 400). Moreover, this process is transparent to the virtual machine due to the active working set management of the procedure. As a result of step 230, the corresponding host memory for the reclaimed $R_i$ pages is released (i.e., becomes free) and the process returns to step 220 to again perform the condition check.

Once the hypervisor 200 determines that the condition is satisfied at step 220, the method proceeds to step 225 where the hypervisor causes the host physical memory 300 (e.g., memory 340A) to store the requested guest physical page content to make the guest physical page active and, therefore, directly accessible by the guest OS (e.g., guest OS 120A) of the requesting virtual machine (e.g., virtual machine 100A).

As will be discussed in more detail below, the hypervisor 200, and, more particularly, physical memory management module 220, is designed to dynamically manage the overall limit of host physical memory 300 that is allocated to each virtual machine. In general, it is contemplated that the following methods (or combination of such) can be employed to assess statistics of the memory utilization in the host OS 240 and each guest OS (e.g., guest OSs 120A and 120B) to select the overall limit for the virtual machine working sets. For example, assessment can be performed by parsing outputs of the utilities that provide the information about the memory utilization or using system or library calls, including registration for notifications about changes of the memory utilization. Moreover, if the kernel address space is accessible from the hypervisor driver, internal kernel memory management structures or kernel memory management API interception may be used in order to determine the fine-grained memory utilization statistics. Furthermore, the assessment can be performed by tracking intensity of accesses of virtualized RAM by periodically protecting the virtual machine working set from access and modification (and count the ratio of pages for which the corresponding guest OS has triggered protection and for which it did not), or by periodically counting and clearing access and dirty bits in the hardware accelerated or shadow paging structures. Yet further, assessment can be performed by counting zero pages (i.e., if the guest OS uses explicit zeroing of free pages) and pages, which have been used for DMA disk I/O and have not been modified since then (i.e., to determine the file system cache size), to deduce effective size of memory that is treated by guest OS as free.

Moreover, it should be appreciated that the overall limit is the major factor that affects the stability of the host OS (e.g., host OS 240), especially for OS X, for example, since the overall limit determines the maximum size of the host physical memory (e.g., memory 300) that can be locked by the hypervisor (e.g. hypervisor 200) and the host kernel memory manager of the host OS cannot reclaim the locked memory to compensate for memory shortage. This means that for existing systems, the hypervisor must take into account the host memory utilization and detect host memory shortage. For example, current hardware virtualization software (e.g., Parallels Desktop for MAC) assume the overall limit is static, which results in host OS hangs if there is another consumer of the host physical memory in the system.

According to the exemplary aspect, the physical memory management module 220 of hypervisor 200 can perform an auto-adjustment mechanism that calculates an overall limit adjustment from the host free memory estimate derived from OS counters. Thus, according to the exemplary aspect, as long as at least one virtual machine (e.g., virtual machine 100A or 100B) is running on the host platform 10, the hypervisor 200 can calculate the host free memory estimation (in pages), referred to as $M_{host\_free}$, and adjust the overall limit accordingly.

Figure 3:
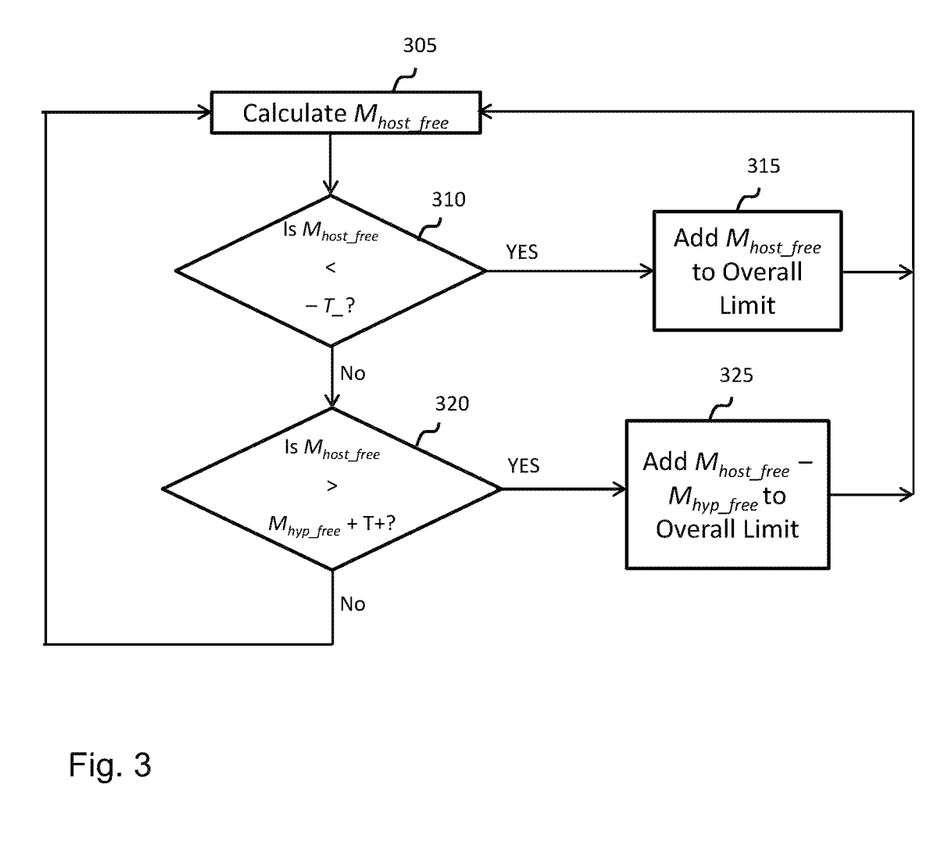
FIG. 3 illustrates a flowchart for a method for managing the overall limit of host physical memory allocated to virtual machines according to an exemplary aspect.

FIG. 3 illustrates a flowchart for a method for managing the overall limit of host physical memory allocated to virtual machines according to an exemplary aspect. As shown, initially at step 305, the physical memory management module 220 of the hypervisor 200 can calculate an estimate of the amount of free host physical memory $M_{host\_free}$ (in terms of pages). This is done using the formula $M_{host\_free} = M_{host} - M_{wired} - K_1 - K_2 \times M_{overhead}$.

According to the exemplary aspect, $M_{host}$ is the size (in pages) of the host physical memory (e.g., memory 300, which is presumably RAM, for example). The value of $M_{host}$ is static to the platform 100 and can be easily determined by the hypervisor 200 as known parameter of the device based on the known size of the primary storage 300 (e.g., RAM) and the number of pages that can be stored thereon. Moreover, $M_{wired}$ is the amount of the host physical memory (in pages) requested for exclusive usage by the host OS kernel or its module (e.g., this memory is called "wired" in the OS X kernel), where the OS X kernel keeps track of this amount of memory in its variable vm_page_wire_count, as known to those skilled in the art. Thus, when the hypervisor 200 begins the calculation process, it parses the host kernel binary to determine the location of the variable in the kernel address space to determine the value of $M_{wired}$ (in pages).

Moreover, $M_{overhead}$ is the amount (in pages) of host memory consumed by the OS X memory compressor (i.e., the value of the expression compressor_bytes_used/PAGE_SIZE where compressor_bytes_used is the OS X kernel variable that keeps track of this amount) in the context of its memory management methods of the host platform. In the context of a MAC operating system the $M_{overhead}$ is the amount of memory consumed by the OS X memory compressor $M_{compressor}$. In general, the OS X memory compressor (i.e., the $M_{compressor}$) can be considered a memory swapping mechanism that does not use the external storage. Rather, it works such that when the host OS kernel decides to take physical pages from a user program, it attempts to compress the content of these pages so that it effectively takes less physical memory. However, this memory cannot be released immediately by the host kernel so the hypervisor 200 cannot assume that it may safely request this memory from the host OS kernel. Thus, the value for $M_{overhead}$ should be considered when estimating the free host physical memory $M_{host\_free}$. Finally, $K_1$ and $K_2$ are configuration parameters that can be static values that are stored in memory of the host platform. These configuration parameters will be discussed in more detail below.

According to the exemplary aspect, the free host physical memory $M_{host\_free}$ is calculated (i.e., step 305) when the hypervisor 200 is loaded into the host OS kernel 240 and the initial overall limit is set to $M_{host\_free}$. Then, $M_{host\_free}$ is calculated periodically (e.g., once a second) while at least one virtual machine is running on the host platform 10 in order to dynamically and continuously adjust the overall limit L as the value of $M_{host\_free}$ changes. Therefore, the hypervisor 200 is designed to dynamically monitor the estimated free host physical memory $M_{host\_free}$.

Once the free host physical memory $M_{host\_free}$ is calculated, the method proceeds to step 310 where the hypervisor 200 determines whether $M_{host\_free}$ is less than a negative value of $T_-$, where $T_-$ is a configurable threshold of pages, as will be discussed in more detail below. It should be noted that the estimated value for $M_{host\_free}$ can be a positive or negative value, where the negative value will indicate that the host OS kernel is likely experiencing a memory shortage of the physical memory 300 so the hypervisor 200 should release as much memory as possible to be used by the host OS. Thus, by comparing $M_{host\_free}$ to a negative value of $T_-$, and if the hypervisor 200 determines that the equation at step 310 is satisfied, the method will proceed to step 315 where the estimated $M_{host\_free}$ will be added to the overall limit for the host physical memory 300. Thus, it should be appreciated that if the host OS is experiencing memory shortage, the overall limit L of memory allocated to the virtual machine(s) will be decreased accordingly.

Otherwise, the method will proceed to step 320, where the hypervisor will evaluate the condition of whether $M_{host\_free}$ is greater than $M_{hyp\_free}$ plus $T_+$, which is also a configurable threshold in terms of pages. According to the exemplary aspect, $M_{hyp\_free} = L - \Sigma_{i=1}^n W_i$, which is the hypervisor free memory counter (i.e., the difference between the overall limit and the amount of the physical memory allocated to running virtual machine(s). If this condition is satisfied, the hypervisor 200 will then adjust the overall limit by adding $M_{host\_free}$ minus $M_{hyp\_free}$ (in pages) to the overall limit L of physical memory allocated for the running virtual machine(s).

Thus, according to the exemplary aspect, the physical memory management module 220 of the hypervisor 200 can continuously and dynamically adjust the designated overall limit L of available physical host memory 300 (i.e., the actual size or amount of memory) allocated to virtual machines running on the host platform 100 to ensure that the host OS 240 has sufficient memory to prevent/minimize hangs while also attempting to allocate as much free memory to the running virtual machine(s) as possible in which active pages can be stored thereon and accessed by the virtual machine(s) during operation. Then after launching and during the execution of the virtual machine(s), at least a portion (e.g., guest memory region 320A, which could equal the overall limit L) of the overall size limit of the physical memory 300 can be allocated to the one or more virtual machines, meaning that active guest pages (e.g., working sets 340A and/or 340B) can be stored in the allocated guest memory regions.

As described above, according to the exemplary aspect, there are four configuration parameters $K_1$, $K_2$, $T_+$, and $T_-$ that are selected by a system designer, for example, to maximize system performance and overall limit management. For example, it is contemplated that $K_1$ equals 262144 (in pages), $K_2$ equals 1 (dimensionless), $T_+$ equals 96000 (in pages), and $T_-$ equals 6400 (in pages). For example, $K_1$ and $K_2$ can be selected to prevent host OS 240 memory shortages and subsequent hangs if, for example, a virtual machine with the RAM size equal to the host memory size is launched, several host processes collectively allocate as much memory as the host memory size and then touch it, and then several guest processes collectively allocate as much memory as the guest memory size and then touch it. Accordingly, the selected value of $K_1$ (e.g., 262144 pages) indicates that the hypervisor 200 will not consume the last GB of unwired memory. Moreover, the selected value of $K_2$ (e.g., 1) indicates that the hypervisor 200 will not attempt to preempt the memory consumed by the OS X memory compressor (according to the calculation of $M_{host\_free}$ discussed above).

Moreover, $T_+$ and $T_-$ can be selected to reduce the amount of overall limit updates since host memory consumption may change fast. For example, the host kernel may sometimes compensate for a memory shortage without the help of the hypervisor 200 so small negative values of $M_{host\_free}$ (e.g., up to ~50 MB) will not require handling (i.e., managing of the overall limit). Likewise, small potential overall limit increases (e.g., up to ~150 MB) will also not require handling. In such a case, neither condition at step 310 or step 320 is satisfied and the method shown in FIG. 3 returns directly to step 305 without adjustment of the overall limit L. Moreover, it is reiterated that these configuration parameters $K_1$, $K_2$, $T_+$, and $T_-$ are selected by the system designer and stored as static values and that the exemplary values noted above are only provided for exemplary purposes of the aspect described herein.

It should be appreciated that the management by hypervisor 200 of the active working set incurs overhead that will be as large as the margin of misconfiguration of the guest memory size. Moreover, users of desktop virtualization are generally not familiar with the architecture of hardware, virtualization software and OS kernel memory management systems, so it becomes a challenge for them to configure the amount of memory for the virtual machine that matches their use cases. Unless the hardware system of the host platform 100 has abundant resources, it is likely that a conventional user of the desktop virtualization software will not be able to avoid the runtime overhead when both the guest OS (e.g., guest OS 120A or 120B) and the host OS 240 consume resources extensively.

Thus, according to a refinement of the exemplary aspect, the hypervisor 200 can calculate a guest memory adjustment A that can be compared with a threshold to determine whether the actual memory allocated for guest operating systems should be reduced before the next virtual machine is launched on host platform 10. In this aspect, the overhead requirements of the memory management system described herein can be mitigated if the guest memory size matches the pattern of the user activity in the host operating system (e.g., OS 240) and guest operating system (e.g., OS 120A) to reduce the amount of memory management invocations.

According to the exemplary aspect, the following heuristics can be used to estimate the most effective size of the guest memory (e.g., guest memory 320A) allocated from host physical memory 300 for the corresponding virtual machine (e.g., virtual machine 100A). The memory utilization is monitored constantly (i.e., continuously or periodically) to determine when either the host OS 240 or the guest OS 120A lacks free memory for operation. The memory utilization statistics may be filtered by cross-referencing it against the virtualization software UI usage statistics. If the hypervisor 200 determines that the guest OS is experiencing memory starvation, but there is no interaction by the user with the virtual machine, then the corresponding statistics can be discarded.

According to an exemplary aspect, the hypervisor 200 is designed to calculate the potential guest memory adjustment A according to the following equation:

$$A = \frac{K_h \cdot \sum_{i=1}^{m}(h_i - 0.1 M_{host}) - K_g \cdot \sum_{i=1}^{m}(g_i - 0.1 M_{guest})}{m},$$

where
m—the number of measurements of the memory utilization,
$K_h$, $K_g$—weight coefficients,
$M_{host}$—the host physical memory size,
$M_{guest}$—the guest physical memory size,
$h_i$—the amount of the free host memory in the i-th measurement, and
$g_i$—the amount of the free guest memory in the i-th measurement.

According to the exemplary aspect, the measurement is calculated for m times, although it should be appreciated that the measurement for adjustment A can be calculated only one time according to an alternative aspect. By performing measurements for m times at a number of different points in time to calculate the adjustment value A, the result can be normalized in accordance to the time during which the virtual machine (e.g., virtual machine 100A) has been running on the host platform 10. By doing so allows selection of the constant thresholds, which at most may depend upon the $K_g$ and $K_h$ selection.

In this exemplary aspect, it is contemplated that only a single virtual machine (e.g., virtual machine 100A) is utilized on the host platform extensively, which is typically the case for a desktop environment. However, when an auxiliary virtual machine (e.g., virtual machine 100B) is launched on the host platform 10, a memory auto-configuration will not be applied to it in the exemplary aspect, and it is treated as yet another host memory consumer. However, in an alternative aspect, it is contemplated that the memory auto-configuration features described herein can be implemented for multiple virtual machines that are employed interchangeably and simultaneously in a chaotic pattern, for example.

In any event, according to the exemplary aspect, if the hypervisor calculates A as a negative number and it is below a predetermined negative threshold, the allocated guest OS memory size will be reduced for the next virtual machine that is launched. In contrast, if potential guest memory adjustment A is a positive number and it is above the threshold, the allocated guest OS memory size is increased for the next virtual machine that launch. In the exemplary aspect, the actual adjustment (i.e., the increase or decrease in the size of the guest OS memory) will be a predetermined amount of data (e.g., a 50 Mb data, for example). In an alternative aspect, the actual adjustment value may depend on the adjustment value A and be either directly or indirectly proportional to this value.

Moreover, it should be appreciated that the positive and negative thresholds applied against the estimated potential guest memory adjustment A can be static values stored in memory and selected by the system designer and may be the same absolute value or different absolute values. Preferably, the thresholds are designed to not allow the guest memory size drift too fast. Moreover, it is noted that alternative algorithms can be used in selecting the positive and negative thresholds according to alternative aspects.

In any event, the calculated negative value matches the host memory starvation and the calculated positive value means guest memory starvation. Thus, the positive and negative thresholds can have matching or different absolute values as discussed above.

Moreover, in accordance with this aspect, $K_h$ and $K_g$ are weight coefficients that are static values that can be stored in system memory and also preselected by a system designer, for example, to introduce the level of tolerance for each type of memory starvation (i.e., for the guest OS or host OS). The ratio of the coefficients at the same time serves as the priority for one of the memory consumers (e.g., the host OS 240) over the other consumer (e.g., the guest OS 120A or 120B) or vice versa. For example, in one implementation, K can be set to 1 and $K_g$ can be set to 0.9 or 0.8 to indicate that host memory shortage is more important than guest memory shortage. Thus, using these weighting coefficients, the system designer can confirm that host memory shortage will be minimized if both the host OS and guest OS are currently experiencing memory shortage. Furthermore, the system designer can bind the ratio of the coefficients to the ratio of the total amount of host memory used by the hypervisor 200 to the amount of memory that is assigned to the guest.

Figure 4:
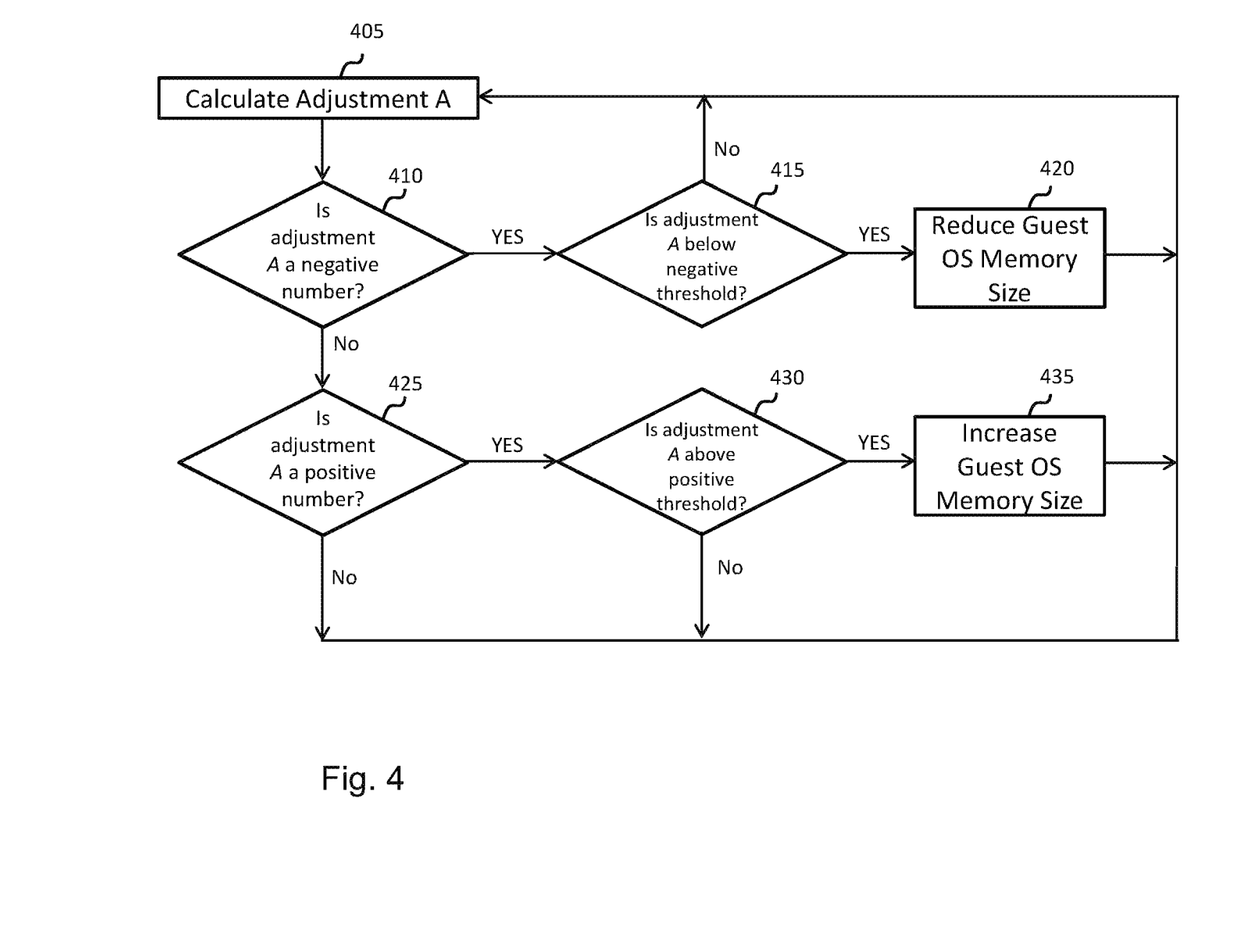
FIG. 4 illustrates a flowchart for a method for guest memory size auto-configuration according to an exemplary aspect.

FIG. 4 illustrates a flowchart for a method for guest memory size auto-configuration according to an exemplary aspect. As shown, initially at step 405, the hypervisor 200 calculates a value for the potential guest memory adjustment A by performing a number of m measurement on the host physical memory 300 to identify: $M_{host}$, $M_{guest}$, $h_i$, and $g_i$. At step 410, the hypervisor 200 will determine whether the calculated value A is a negative number. If so, the hypervisor 200 will then compare the calculated value A with a negative threshold at step 415. If it is not below the threshold, the method will return step 405. Otherwise, the method will proceed to step 420 and reduce the guest OS memory size (e.g., by 50 Mb) to prevent memory starvation by the host OS. Again, the method will return to step 405, where the calculation of value A can be repeated.

Alternatively, at step 410, if the calculated value A is not negative, the method will proceed to step 425 where the hypervisor 200 will determine if the calculated adjustment value A is a positive number. It should be understood that the adjustment value A will almost always be either positive or negative. However, for purposes of completeness of the flowchart, the method is shown to return to step 405 if the value A is not determined to be a positive value at step 425. At step 430, the hypervisor 200 will then determine whether the adjustment value A is above a positive threshold. If not, the method will return to step 405 in a similar manner as described above. If it is above this positive threshold, the method will proceed to step 435 and increase the guest OS memory size (e.g., by 50 Mb) to prevent memory starvation by the guest OS. Again, the method will return to step 405, where the calculation of value A can be repeated. Thus, by automatically configuring the guest memory size on a dynamic basis, the system overhead described above with respect to the overall limit management can be mitigated.

FIG. 5 illustrates a block diagram of an example of a general-purpose computer system (which can be a personal computer or server) on which the disclosed system and method can be implemented according to an exemplary aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to the host platform 100 described above, processing unit 21 can correspond to the host CPU and/or one or more of the virtual CPUs, system memory 22 can correspond to the primary storage (e.g. host physical memory 30) and the hard disk 27 can correspond to secondary storage 400.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include the hard disk drive 27 for reading from and writing to a hard disk, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in software, in which the methods may be stored as one or more instructions or code on a non-volatile computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for managing memory allocation for a virtual machine running on a host platform, the method comprising:
   continuously calculating an amount of free physical memory of the host platform depending on a difference between a size of physical memory of the host platform and an amount of the physical memory of the host platform allocated for exclusive use by a kernel of an operating system of the host platform;
   allocating, to a first virtual machine running on the host platform, a first amount of the free physical memory; and
   prior to a launch of a second virtual machine on the host platform:
      calculating a guest memory adjustment A based on patterns of user activity, over a plurality of memory measurements, of the operating system of the host platform and an operating system of the first virtual machine;
      if the guest memory adjustment A is a negative value, determining a second amount of the free physical memory to allocate to the second virtual machine; and
      if the guest memory adjustment A is a positive value, determining a third amount of the free physical memory to allocate to the second virtual machine, wherein the third amount is greater than the second amount.

2. The method according to claim 1, wherein the first amount of the free physical memory is comprised in an allocated physical memory, further comprising storing a set of active pages in the allocated physical memory to be accessed by an application running on the first virtual machine.

3. The method according to claim 1, wherein an amount of the physical memory of the host platform currently used by the operating system of the host platform includes $M_{wired}$ and $M_{overhead}$,
   wherein $M_{wired}$ is the amount of the physical memory of the host platform allocated for exclusive use by the kernel and wherein $M_{overhead}$ is an amount of the physical memory of the host platform used by an operation system kernel for memory management of the operating system of the host platform.

4. The method according to claim 3, further comprising calculating the amount of the free physical memory of the host platform according to the formula $M_{host\_free}=M_{host}-M_{wired}-K_1-K_2 \times M_{overhead}$, wherein $K_1$ and $K_2$ are static configuration parameters, wherein $M_{host\_free}$ is the amount of the free physical memory of the host platform, and wherein $M_{host}$ is the size of physical memory of the host platform.

5. The method according to claim 4, further comprising:
   determining an overall limit, of the physical memory of the host platform, for memory allocation to all virtual machines running on the host platform;

dynamically adjusting the overall limit of the physical memory of the host platform by:
decreasing the overall limit by a value of $M_{host\_free}$ if $M_{host\_free}$ is a negative value and greater than a first threshold; and
increasing the overall limit by a value of $M_{host\_free}$ minus $M_{hyp\_free}$ if $M_{host\_free}$ is a positive value and greater than a second threshold,
wherein $$M_{hyp\_free} = L - \sum_{i=1}^{n} W_i,$$

wherein L is the overall limit and $W_i$ is a size of an active working set of guest pages currently stored in the physical memory of the host platform for the i-th virtual machine of all virtual machines running on the host platform, wherein $M_{hyp\_free}$ is a difference between the overall limit and an amount of the physical memory of the host platform allocated to running virtual machines on the host.

6. The method according to claim 1, wherein the calculating of the guest memory adjustment A comprises performing a plurality of m of memory measurements of a time period and applying the memory measurements to a formula:

$$A = \frac{K_h \cdot \sum_{i=1}^{m} (h_i - 0.1 M_{host}) - K_g \cdot \sum_{i=1}^{m} (g_i - 0.1 M_{guest})}{m}$$

wherein:
m is a number of memory measurements,
$K_h$, $K_g$ are predetermined weight coefficients,
$M_{host}$ is the size of the physical memory of the host platform,
$M_{guest}$ is a size of the first amount of the free physical memory allocated to the first virtual machine,
$h_i$ is an amount of the free physical memory of the host platform in the i-th measurement, and
$g_i$ is an amount of free guest memory of the free physical memory allocated to the first virtual machine in the i-th measurement.

7. The method according to claim 1, wherein, upon initially launching the first virtual machine on the host platform, the method further comprises:
calculating an initial amount of the free physical memory of the host platform by subtracting an amount of the physical memory of the host platform currently used by the operating system of the host platform from the size of the physical memory of the host platform; and
setting the initial amount of the free physical memory of the host platform as an overall limit of the physical memory of the host platform.

8. The method of claim 1, further comprising:
prior to a launch of the second virtual machine on the host platform, adjusting the first amount of the free physical memory allocated to the first virtual machine by:
increasing the first amount of the free physical memory by a first predetermined amount of memory if the guest memory adjustment A is above a first threshold; and
decreasing the first amount of the free physical memory by a second predetermined amount of memory if the guest memory adjustment A is below a second threshold.

9. A system for managing memory allocation for a virtual machine running on a host platform, the system comprising:
physical memory of the host platform; and
a hypervisor running on a host operating system of the host platform, the hypervisor designed to:
continuously calculate an amount of free physical memory of the host platform depending on a difference between a size of the physical memory of the host platform and an amount of the physical memory of the host platform allocated for exclusive use by a kernel of the host operating system of the host platform;
allocate, to a first virtual machine running on the host platform, a first amount of the free physical memory; and
prior to a launch of a second virtual machine on the host platform:
calculating a guest memory adjustment A based on patterns of user activity, over a plurality of memory measurements, of the host operating system and an operating system of the first virtual machine;
if the guest memory adjustment A is a negative value, determine a second amount of the free physical memory to allocate to the second virtual machine when launched; and
if the guest memory adjustment A is a positive value, determine a third amount of the free physical memory to allocate to the second virtual machine when launched, wherein the third amount is greater than the second amount.

10. The system according to claim 9, wherein the first amount of the free physical memory is comprised in an allocated physical memory, wherein the hypervisor stores a set of active pages in the allocated physical memory, to be accessed by an application running on the first virtual machine.

11. The system according to claim 9, wherein an amount of physical memory of the host platform currently used by the host operating system includes $M_{wired}$ and $M_{overhead}$, wherein $M_{wired}$ is the amount of the physical memory of the host platform allocated for exclusive use by the kernel and wherein $M_{overhead}$ is an amount of the physical memory of the host platform used by an operation system kernel for memory management of the host operating system.

12. The system according to claim 11, wherein the hypervisor calculates the amount of free physical memory of the host platform according to the formula $M_{host\_free} = M_{host} - M_{wired} - K_1 - K_2 \times M_{overhead}$, wherein $K_1$ and $K_2$ are static configuration parameters, wherein $M_{host\_free}$ is the amount of the free physical memory of the host platform, and wherein $M_{host}$ is the size of physical memory of the host platform.

13. The system according to claim 12, wherein the hypervisor further:
determines an overall limit, of the physical memory of the host platform, for memory allocation to all virtual machines running on the host platform; and
dynamically adjusts the overall limit of the physical memory of the host platform by:

decreasing the overall limit by a value of $M_{host\_free}$ if $M_{host\_free}$ is a negative value and greater than a first threshold; and increasing the overall limit by a value of $M_{host\_free}$ minus $M_{hyp\_free}$ if $M_{host\_free}$ is a positive value and greater than a second threshold, wherein $$M_{hyp\_free} = L - \sum_{i=1}^{n} W_i,$$

wherein L is the overall limit and $W_i$ is a size of an active working set of guest pages currently stored in the physical memory of the host platform for the i-th virtual machine of all virtual machines running on the host platform, wherein $M_{hyp\_free}$ is a difference between the overall limit and an amount of the physical memory of the host platform allocated to running virtual machines on the host.

14. The system according to claim 9, wherein the hypervisor calculates the guest memory adjustment A by performing a plurality of m of memory measurements of a time period and applying the memory measurements to a formula:

$$A = \frac{K_h \cdot \sum_{i=1}^{m}(h_i - 0.1 M_{host}) - K_g \cdot \sum_{i=1}^{m}(g_i - 0.1 M_{guest})}{m}$$

wherein:
m is a number of memory measurements,
$K_h$, $K_g$ are predetermined weight coefficients,
$M_{host}$ is the size of the physical memory of the host platform,
$M_{guest}$ is a size of the first amount of the free physical memory allocated to the first virtual machine,
$h_i$ is an amount of the free physical memory of the host platform in the i-th measurement, and
$g_i$ is an amount of free guest memory of the fee physical memory allocated to the first virtual machine in the i-th measurement.

15. The system according to claim 9, wherein, upon initially launching the first virtual machine on the host platform, the hypervisor is further designed to:
calculate an initial amount of the free physical memory of the host platform by subtracting an amount of the physical memory of the host platform currently used by the host operating system of the host platform from the size of the physical memory for the host platform; and
set the initial amount of the free physical memory of the host platform as an overall limit of the physical memory of the host platform to be allocated to the first virtual machine.

16. The system of claim 9, wherein the hypervisor is further designed to:
prior to a launch of the second virtual machine on the host platform, adjust the first amount of the free physical memory allocated to the first virtual machine by:
increasing the first amount of the free physical memory by a first predetermined amount of memory if the guest memory adjustment A is above a first threshold; and decreasing the first amount of the free physical memory by a second predetermined amount of memory if the guest memory adjustment A is below a second threshold.

17. A method for managing memory allocation for a virtual machine running on a host platform, the method comprising:
continuously calculating an amount of free physical memory of the host platform by subtracting an amount of physical memory of the host platform currently used by a host operating system of the host platform from a total size of the physical memory of the host platform;
allocating, to a first virtual machine running on the host platform, a first amount of the free physical memory; and
prior to a launch of a second virtual machine on the host platform:
calculating a guest memory adjustment A, based on patterns of user activity of the host operating system and an operating system of the first virtual machine by:
performing a plurality of m of memory measurements of a time period and applying the memory measurements to a formula based on weighted coefficients, size of the physical memory of the host platform, size of the first amount of the free physical memory, an amount of the free physical memory of the host platform and an amount of free guest memory of an allocated physical memory to the first virtual machine;
if the guest memory adjustment A is a negative value, determine a second amount of the free physical memory to allocate to the second virtual machine when launched; and
if the guest memory adjustment A is a positive value, determine a third amount of the free physical memory to allocate to the second virtual machine when launched, wherein the third amount is greater than the second amount.

18. The method of claim 17, wherein the formula is:

$$A = \frac{K_h \cdot \sum_{i=1}^{m}(h_i - 0.1 M_{host}) - K_g \cdot \sum_{i=1}^{m}(g_i - 0.1 M_{guest})}{m}$$

wherein:
m is a number of memory measurements,
$K_h$, $K_g$ are predetermined weight coefficients,
$M_{host}$ is the size of the physical memory of the host platform,
$M_{guest}$ is a size of the first amount of the free physical memory allocated to the first virtual machine,
$h_i$ is an amount of the free physical memory of the host platform in the i-th measurement, and
$g_i$ is an amount of free guest memory of the fee physical memory allocated to the first virtual machine in the i-th measurement.

19. The method according to claim 17, wherein, upon initially launching the first virtual machine on the host platform, the method further comprises:
calculating an initial amount of the free physical memory of the host platform by subtracting an amount of the physical memory of the host platform currently used by the host operating system of the host platform from the total size of the physical memory for the host platform; and setting the initial amount of the free physical memory of the host platform as an overall limit of the physical memory of the host platform to be allocated to the first virtual machine.

20. The method of claim 17, further comprising:

prior to a launch of the second virtual machine on the host platform, adjusting the first amount of the free physical memory allocated to the first virtual machine by:

increasing the first amount of the free physical memory by a first predetermined amount of memory if the guest memory adjustment A is above a first threshold; and decreasing the first amount of the free physical memory by a second predetermined amount of memory if the guest memory adjustment A is below a second threshold.

\* \* \* \* \*